US012579148B2

(12) United States Patent
Shang et al.

(10) Patent No.: US 12,579,148 B2
(45) Date of Patent: Mar. 17, 2026

(54) DATA ACCESS METHOD, DATABASE SYSTEM, AND STORAGE APPARATUS

(71) Applicant: HUAWEI TECHNOLOGIES CO., LTD., Shenzhen (CN)

(72) Inventors: Jingliang Shang, Beijing (CN); Dousheng Zhao, Beijing (CN); Yu Cao, Beijing (CN); Bingjian Hou, Shenzhen (CN); Chunhua Tan, Chengdu (CN); Peng Zhang, Chengdu (CN); Yusheng Wang, Beijing (CN); Zhifei Tian, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 4 days.

(21) Appl. No.: 18/592,163

(22) Filed: Feb. 29, 2024

(65) Prior Publication Data

US 2024/0202195 A1 Jun. 20, 2024

Related U.S. Application Data

(63) Continuation of application No. PCT/CN2022/104813, filed on Jul. 11, 2022.

(30) Foreign Application Priority Data

Aug. 31, 2021 (CN) .......................... 202111017333.1

(51) Int. Cl.
*G06F 16/24* (2019.01)
*G06F 16/2455* (2019.01)
*G06F 16/25* (2019.01)

(52) U.S. Cl.
CPC ...... *G06F 16/24553* (2019.01); *G06F 16/252* (2019.01)

(58) Field of Classification Search
CPC . G06F 16/24553; G06F 16/252; G06F 16/215
See application file for complete search history.

(56) References Cited

U.S. PATENT DOCUMENTS

| | | | | |
|---|---|---|---|---|
| 9,892,137 | B2 * | 2/2018 | Olivieri | G06F 16/219 |
| 9,910,871 | B2 * | 3/2018 | Stork | G06F 16/284 |
| 11,392,624 | B2 * | 7/2022 | Haprian | G06F 16/2246 |
| 11,436,344 | B1 * | 9/2022 | Juch | G06F 16/215 |
| 2003/0172059 | A1 | 9/2003 | Andrei | |

(Continued)

FOREIGN PATENT DOCUMENTS

CN 112988879 A 6/2021

*Primary Examiner* — Merilyn P Nguyen
(74) *Attorney, Agent, or Firm* — Leydig, Voit & Mayer, Ltd.

(57) ABSTRACT

A data access method, a database system, and a storage apparatus are provided. A computing device includes a database operation request in a transmission command sent to a storage device. The database operation request is used to request to perform an operation on a data object in a database. After receiving the transmission command, the storage device parses the transmission command to obtain the database operation request, and then performs, on the data object in the operation request, the operation that is requested by the operation request, without conversion performed by a file system or a block device. Therefore, efficiency of the database system accessing data is improved.

27 Claims, 8 Drawing Sheets

(56)        References Cited

U.S. PATENT DOCUMENTS

| 2017/0199875 | A1* | 7/2017 | Nevrekar | G06F 16/24553 |
| 2019/0391978 | A1* | 12/2019 | Liu | G06F 16/2282 |
| 2020/0394165 | A1* | 12/2020 | Danda | G06F 16/215 |
| 2021/0311950 | A1* | 10/2021 | Quakkelaar | G06F 16/27 |

* cited by examiner

DATA ACCESS METHOD, DATABASE SYSTEM, AND STORAGE APPARATUS

CROSS-REFERENCE TO RELATED APPLICATIONS

This application is a continuation of International Application No. PCT/CN2022/104813, filed on Jul. 11, 2022, which claims priority to Chinese Patent Application Chinese Patent Application No. 202111017333.1, filed on Aug. 31, 2021. The disclosures of the aforementioned applications are hereby incorporated by reference in their entireties.

TECHNICAL FIELD

Embodiments of this application relate to the field of storage technologies, and in particular, to a data access method, a database system, and a storage apparatus.

BACKGROUND

Storage-compute separation in a database means that a database system is separated into at least one computing apparatus and at least one storage apparatus, where storage space in the storage apparatus is shared by all computing apparatuses. Currently, in a storage-compute separated database system, a file system or a block device is deployed in a storage apparatus. To implement adaptation between the computing apparatus and the storage apparatus, before requesting a storage node to execute an operation request, the computing apparatus needs to convert a database semantic operation request into a file system semantic operation request or a block device semantic operation request. In the storage node, an access object needs to be found via a local block device or a local file system, so that data can be processed. Consequently, efficiency of a database accessing the storage node is low. Therefore, how to improve the efficiency of the database accessing the storage node in the storage-compute separated database system becomes an urgent technical problem to be resolved.

SUMMARY

This application provides a data access method, a database system, and a storage apparatus. According to technical solutions provided in this application, when accessing data of the storage apparatus, a computing apparatus of the database system directly transmits a database operation request to the storage apparatus. The storage apparatus directly processes a data object carried in the database operation request without conversion performed by a file system or a block device, to improve efficiency of the database system accessing data.

According to a first aspect, this application provides a data transmission method performed by a storage device. The storage device receives a transmission command sent by a computing device. The transmission command carries a database operation request. The database operation request is used to request to perform an operation on a data object in a database. The object in the database is, for example, a database instance, a table, a page, or the like. The database operation request is, for example, creating the table, deleting the table, writing the page, or the like. After receiving the transmission command, the storage device parses the transmission command to obtain the database operation request, and then performs, on the data object in the operation request, the operation that is requested by the operation request.

According to the data transmission method provided in this application, the computing device may directly send the database operation request to the storage device by using the transmission command. After receiving the transmission command, the storage device may obtain the database operation request from the transmission command, and directly process the database operation request without conversion performed by a file system or a block device. Therefore, efficiency of a database system accessing data is improved.

In some implementations, the storage device stores a function that executes the database operation request, and the function is a database semantic function. When executing the database operation request, a storage node first invokes the function based on the database operation request, and then performs the function to execute the database operation request.

In this implementation, the function of the database operation request is offloaded to the storage node for execution, so that the amount of data exchanged between a computing node and the storage node is reduced, and load of the computing node is reduced.

In some implementations, the storage device stores a correspondence between the operation request and a storage address that stores the function. In this way, when the function is invoked based on the database operation request, the storage address of the function corresponding to the database operation request may be obtained based on the correspondence, and then the function is run after the function is read from the storage address.

In this implementation, because the storage device stores the correspondence between the database operation request and the storage address that stores the function, after the computing device sends the operation request to the storage device, the storage device can obtain the corresponding function based on an identifier of the database operation request without the file system or the block device. This simplifies metadata and improves access efficiency.

In some implementations, when the database operation request is a data operation request, for example, an operation request related to writing data to the storage node, reading data, or deleting data, the storage node determines an address of to-be-operated data based on an identifier of the to-be-operated data, and performs an operation on the to-be-operated data based on the address of the to-be-operated data when receiving the database operation request and invoking the function to execute the database operation request.

In some implementations, the storage device stores a correspondence between the identifier of the to-be-operated data and the storage address of the to-be-operated data. In this way, the address that is of the to-be-operated data and that corresponds to the identifier of the to-be-operated data may be determined based on the correspondence.

In this implementation, because the storage device stores the direct correspondence between the identifier of the to-be-operated data and the storage address of the to-be-operated data, the storage device can directly and quickly determine the address of the to-be-operated data based on the address of the to-be-operated data, and the storage device does not need to obtain the data indirectly via the file system or the block device. In other words, the storage device can quickly read the to-be-operated data. Therefore, efficiency of the database accessing the storage node is improved.

In some implementations, the data object includes any one or more of the following: a database instance, a table, a page, metadata, a log, a database checkpoint, a row, or a column.

In some implementations, the data operation request includes any one of the following operation requests: deleting the database instance, deleting the table, truncating the table, creating a database instance backup, deleting the database instance backup, creating the database checkpoint, restoring the database checkpoint, deleting the database checkpoint, cloning the database instance, writing the page, reading the page, creating the row, deleting the row, reading the row, writing the row, deleting a database log, reading the log, writing the log, reading the metadata, writing the metadata, deleting the metadata, locking the data object, and unlocking the data object.

In some implementations, when the data operation request is a data object creation request, invoking the function based on the database operation request to perform the operation that is requested by the database operation request includes: creating the data object in the storage device by performing the function. Optionally, the operation request includes any one of the following operation requests: creating a database instance, creating a table, creating a metadata, or creating a database log.

In this implementation, when the database operation request received by the storage device requests to create the data object, the storage device can directly identify semantics of the data object creation request and create the data object. The data object creation request can be identified, and the computing device does not need to convert the data object creation request into a file system semantic operation request or a block device semantic operation request. Therefore, a speed of the storage device creating the data object is improved.

In some implementations, the storage device stores an operator that performs a database task. The data operation request is an operator pushdown request. An operation object includes an operator identifier and an identifier of data performed by the operator corresponding to the operator identifier. Invoking the function based on the database operation request to perform the operation that is requested by the database operation request includes: invoking and performing a function corresponding to the operator pushdown request; when the function is performed, obtaining the operator corresponding to the operator identifier based on the operator identifier; obtaining the data corresponding to the data identifier based on the data identifier; and using the operator to perform an operation corresponding to the operator on the data.

In this implementation, when the database operation request received by the storage device is the operator pushdown request, the storage device can directly identify the operator pushdown request, directly determine a storage address of the data performed by the operator based on the identifier of the data performed by the operator, and obtain a storage address of the operator corresponding to the operator identifier based on the operator identifier. Then, after the data and the operator in each storage address are read, the operator may be used to perform the operation on the data, and complete an operator pushdown operation. However, in a conventional technology, to implement an operator pushdown operation, an operator needs to be first registered with a storage device, and then the operator is returned to a computing device as a file in a file system. When performing an operator pushdown task, the computing device needs to convert the operator into a file. Then, a storage node finds a corresponding operator based on a directory structure in the file system, and performs the operator pushdown operation. Therefore, compared with the conventional technology, in the operator pushdown operation in this implementation, an operator that is to be pushed down does not need to be converted via the file system. Therefore, efficiency of executing the operator pushdown operation request is improved.

In some implementations, the data operation request is an operator registration request. An operation object includes an operator identifier. An operator is used to perform a database task. Invoking the function based on the database operation request to perform the operation that is requested by the database operation request includes: when the function is performed, allocating a storage address to the operator; storing the operator; and recording a correspondence between the operator identifier of the operator and the storage address of the operator.

In this implementation, when the database operation request received by the storage device is the operator registration request, the storage device can directly identify semantics of the operator registration request, allocate the storage address to the operator, store the operator in the storage address, and record the correspondence between the identifier and the storage address that stores the operator. Further, when the storage node receives the operator pushdown request, the storage device can quickly determine, based on the identifier of operator that is carried in the operator pushdown request and the recorded correspondence between the operator identifier of the operator and the storage address, the storage address that stores the operator. Therefore, the efficiency of executing the operator pushdown operation request is improved.

In some implementations, the storage device is a device configured to perform persistent storage on the data. The storage device is a storage node in a storage array or a distributed storage system.

In some implementations, the transmission command includes a payload field, and the payload field includes the database operation request.

In some implementations, the transmission command is transmitted according to an NVMe protocol, the transmission command is transmitted according to an iSCSI protocol, or the transmission command is transmitted according to an RDMA protocol.

According to a second aspect, this application provides a storage device. The device includes a plurality of modules, and the plurality of modules of the apparatus are configured to implement the method according to any one of the implementations of the first aspect.

According to a third aspect, this application provides a data transmission method performed by a computing device. The computing device sends a transmission command to a storage device. The transmission command carries a database operation request, and the database operation request is used to request to perform an operation on a data object in a database.

According to the data transmission method provided in this application, the computing device can directly send the database operation request to the storage device by using the transmission command, without conversion performed by a file system or a block device. Therefore, efficiency of a database system accessing data is improved.

In some implementations, the database operation request is a data operation request, and the data object includes an identifier of to-be-operated data.

Optionally, the data object includes any one or more of the following: a database instance, a table, a page, metadata, a log, a database checkpoint, a row, or a column.

In some implementations, the data operation request includes any one of the following operation requests: deleting the database instance, deleting the table, truncating the table, creating a database instance backup, deleting the database instance backup, creating the database checkpoint, restoring the database checkpoint, deleting the database checkpoint, cloning the database instance, writing the page, reading the page, creating the row, deleting the row, reading the row, writing the row, deleting a database log, reading the log, writing the log, reading the metadata, writing the metadata, deleting the metadata, locking the data object, and unlocking the data object.

In some implementations, the data operation request is a data object creation request. Optionally, the operation request includes any one of the following operation requests: creating a database instance, creating a table, creating metadata, or creating a database log.

In some implementations, the data operation request is an operator pushdown request. An operation object includes an operator identifier and an identifier of data performed by an operator corresponding to the operator identifier.

In some implementations, the data operation request is an operator registration request. An operation object includes an operator identifier, and an operator is used to perform a database task.

In some implementations, the transmission command includes a payload field, and the payload field includes the database operation request.

In some implementations, the transmission command is transmitted according to an NVMe protocol, the transmission command is transmitted according to an iSCSI protocol, or the transmission command is transmitted according to an RDMA protocol.

According to a fourth aspect, this application provides a computing device. The device includes a plurality of modules. The plurality of modules of the apparatus are configured to implement the method according to any one of the implementations of the third aspect.

According to a fifth aspect, this application provides a storage system. The storage system includes the storage device according to any one of the implementations of the first aspect and the computing device according to any one of the implementations of the fourth aspect of this application. According to a sixth aspect, this application provides a storage device, including a processor and a memory. The memory stores program instructions, and the processor runs the program instructions to perform the method according to any one of the implementations of the first aspect.

According to a sixth aspect, this application provides a computing device, including a processor and a memory. The memory stores program instructions, and the processor runs the program instructions to perform the method according to any one of the implementations of the third aspect.

According to a seventh aspect, this application provides a computer-readable storage medium. The computer-readable storage medium includes program instructions. When the program instructions are run on a computing device, the computing device is enabled to implement the method according to the first aspect or the third aspect.

According to an eighth aspect, this application provides a chip used in a storage device, including a communication interface and a processor. The communication interface is configured to receive a transmission command transmitted by a computing node. The processor is configured to per-form the method according to any one of the implementations of the first aspect to execute the transmission command.

According to a ninth aspect, this application provides a chip used in a computing device, including a communication interface and a processor. The communication interface is configured to send a transmission command to a storage device. The processor is configured to perform the method according to any one of the implementations of the third aspect, to send the transmission command to the storage device and indicate the storage device to execute the transmission command.

DESCRIPTION OF EMBODIMENTS

Figure 1:
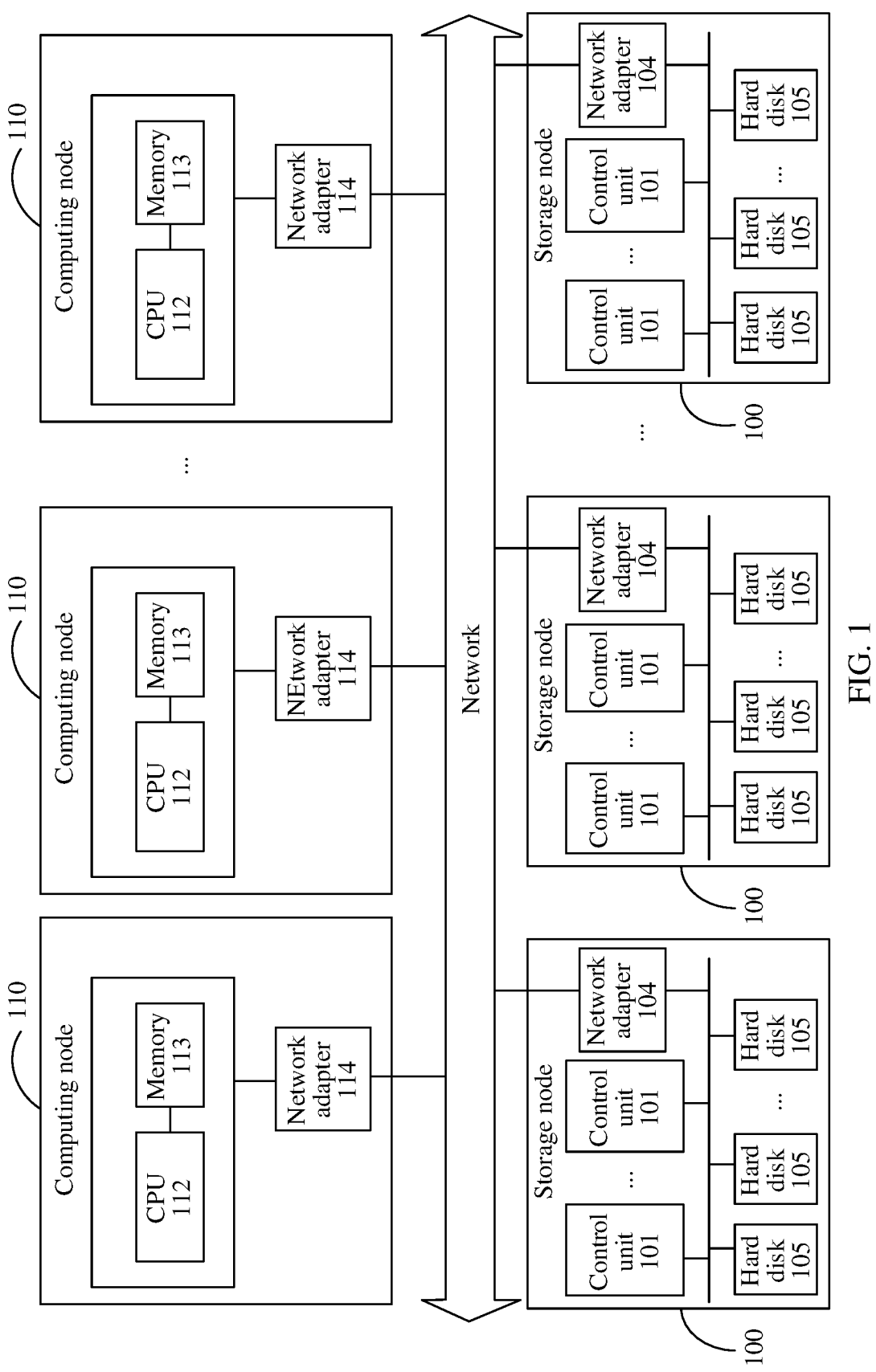
FIG. 1 is an example diagram of an architecture of a distributed storage system according to an embodiment of this application.

FIG. 1 is a schematic diagram of an architecture of a distributed storage system according to an embodiment of this application. As shown in FIG. 1, the distributed storage system provided in this embodiment includes a computing node cluster and a storage node cluster.

The computing node cluster includes one or more computing nodes 110. FIG. 1 shows three computing nodes 110, but is not limited to the three computing nodes 110. Communication between computing nodes 110 may be implemented via a network. The computing node 110 is a computing device, is a node and a hub of network data, and is responsible for providing information services for a plurality of clients or users in a network at the same time, such as a server, a computer, and the like.

In terms of hardware, as shown in FIG. 1, the computing node 110 includes at least a processor 112, a memory 113, and a network adapter 114. The processor 112 is a central processing unit (CPU), and is configured to process a data access request from the outside of the computing node 110, or a request generated inside the computing node 110.

For example, when receiving a data write request sent by a user, the processor 112 temporarily stores data in the data write request in the memory 113. When a total amount of data in the memory 113 reaches a specific threshold, the processor 112 sends the data stored in the memory 113 to a storage node 100 to perform persistent storage. In addition, the processor 112 is further configured to perform computing or processing on data, for example, metadata management, deduplication, data compression, virtualized storage space, and address translation.

FIG. 1 shows only one CPU 112. During actual application, one computing node 110 may include a plurality of CPUs 112. One CPU 112 may include one or more CPU cores. A quantity of CPUs and a quantity of CPU cores are not limited in this embodiment.

The memory 113 is an internal memory that directly exchanges data with the processor. The data can be read and written in the memory at a high speed at any time, and the memory serves as a temporary data memory of an operating system or another running program. The memory includes at least two types of memories. For example, the memory may be a random access memory or a read-only memory (ROM). For example, the random access memory is a dynamic random access memory (DRAM), or a storage class memory (SCM).

The DRAM is a semiconductor memory, and is a volatile memory device like most random access memories (RAMs). The SCM uses a composite storage technology that combines both a conventional storage apparatus feature and a memory feature. The storage class memory can provide a higher read/write speed than a hard disk, but is slower than the DRAM in terms of an access speed and cheaper than the DRAM in terms of costs. However, the DRAM and the SCM are merely examples for description in this embodiment. The memory may further include another random-access memory, for example, a static random-access memory (SRAM). The read-only memory, for example, may be a programmable read-only memory (PROM), an erasable programmable read-only memory (EPROM), or the like.

In addition, the memory 113 may alternatively be a dual in-line memory module or a dual in-line memory module (DIMM), namely a module including a dynamic random-access memory (DRAM), or a solid-state drive (SSD).

During actual application, a plurality of memories 113 and different types of memories 113 may be configured in the computing node 110. A quantity and types of the memories 113 are not limited in this embodiment. In addition, the memory 113 may be configured to have a power failure protection function. The power failure protection function means that the data stored in the memory 113 is not lost even when the system is powered on again after a power failure. A memory having a power failure protection function is referred to as a non-volatile memory.

The network adapter 114 is configured to communicate with the storage node 100. For example, when the total amount of data in the memory 113 reaches the specific threshold, the computing node 110 may send a request to the storage node 100 via the network adapter 114 to perform persistent storage on the data. In addition, the computing node 110 may further include a bus, configured to perform communication between internal components of the computing node 110. In terms of a function, because a main function of the computing node 110 in FIG. 1 is a computing service, a remote memory may be used to implement persistent storage during data storage. Therefore, compared with a conventional server, the computing node has fewer local memories. Therefore, costs and space are reduced. However, this does not mean that the computing node 110 cannot have a local memory. During actual implementation, the computing node 110 may alternatively have a few built-in hard disks or external hard disks. Any computing node 110 may access any storage node 100 in the storage node cluster via the network.

The storage node cluster may include a plurality of storage nodes 100. The storage nodes are configured to perform persistent storage on the data transmitted by the computing node. FIG. 1 shows three storage nodes 100, but is not limited to the three storage nodes 100. For example, there may be more than three storage nodes, or there may be fewer than three storage nodes.

One storage node 100 includes one or more control units 101, a network adapter 104, and a plurality of hard disks 105. The network adapter 104 is configured to communicate with the computing node 110. The hard disk 105 is configured to store data, and may be a magnetic disk or a storage medium of another type, for example, a solid-state drive, a shingled magnetic recording hard disk, or the like. The control unit 101 is configured to write data to the hard disk 105 or read data from the hard disk 105 based on a data read/write request sent by the computing node 110. In a process of reading/writing the data, the control unit 101 needs to convert an address carried in the data read/write request into an address that can be identified by the hard disk. It can be seen that the control unit 101 also has some simple computing functions.

During actual application, the control unit 101 may have a plurality of forms. In one case, the control unit 101 includes a CPU and a memory. The CPU is configured to perform an operation such as address translation and data reading/writing. The memory is configured to temporarily store data to be written to the hard disk 105, or data that is read from the hard disk 105 and that is to be sent to the computing node 110. In another case, there may be one control unit 101, or there may be two or more control units 101. When the storage node 100 includes at least two control units 101, there may be a belonging relationship between the hard disk 105 and a control unit 101. When there is the belonging relationship between the hard disk 105 and the control unit 101, each control unit can access only the hard disk that belongs to the control unit. Therefore, this is usually related to data read/write request forwarding between the control units 101. Consequently, a data access path is long. In addition, if storage space is insufficient, when a new hard disk 105 is added to the storage node 100, the belonging relationship between the hard disk 105 and the control unit 101 needs to be rebound, and this operation is complex. Consequently, scalability of the storage space is poor.

Therefore, in another implementation, a function of the control unit 101 may be offloaded to the network adapter 104. In other words, in the implementation shown in FIG. 1, the storage node 100 does not have the controller 101, and the network adapter 104 completes data reading/writing, address translation, and another computing function. In this case, the network adapter 104 is an intelligent network adapter. The intelligent network adapter may include a CPU and a memory. The CPU is configured to perform an operation such as address translation and data reading/writing. The memory is configured to temporarily store data to be written to the hard disk 105, or data that is read from the hard disk 105 and that is to be sent to the computing node 110. There is no belonging relationship between the network adapter 104 and the hard disk 105 in the storage node 100. The network adapter 104 may access any hard disk 105 in the storage node 100. Therefore, it is convenient to expand a hard disk when the storage space is insufficient.

Figure 2:
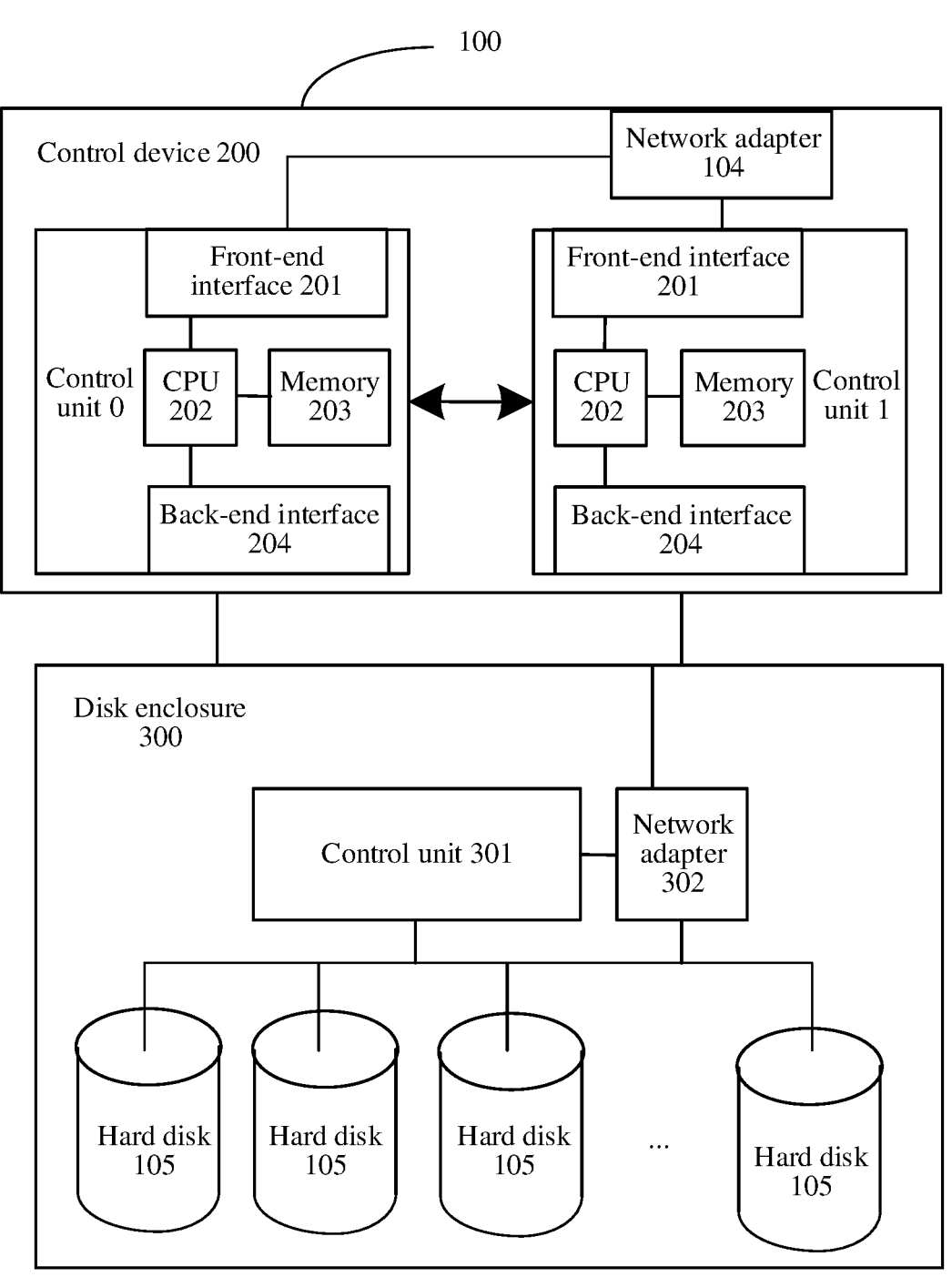
FIG. 2 is an example diagram of an architecture of a disk-controller separated storage node according to an embodiment of this application.

The structure of the storage node shown in FIG. 1 is a disk-controller integrated architecture. In other words, the control unit and the hard disk 105 are included in a same physical device. However, in some embodiments, the structure of the storage node may alternatively be a disk-controller separated structure. As two independent devices, a control device and a storage device, namely, a control device 200 and a disk enclosure 300 are connected to each other as shown in FIG. 2. The control device 200 includes a plurality of control units, for example, a control unit 0 and a control unit 1. The plurality of control units are connected to a computing node 110 via a network adapter 104. Each control unit has a same structure. The control unit 0 is used as an example. The control unit 0 includes a front-end interface 201, a CPU 202, a memory 203, and a back-end interface 204. The front-end interface 201 is connected to the network adapter 104, to transmit, to the control unit 0, data sent by the computing node via the network adapter. The back-end interface 204 is connected to the disk enclosure, to transmit data that has been processed by the control unit 0 to the disk enclosure 300 for storage. The CPU 202 and the memory 203 are configured to process data transmitted by the computing node 110 or data of a program that runs locally. For details, refer to descriptions of the CPU 112 and the memory 113 in the computing node 110. The details are not described herein. As an independent device, the disk enclosure 300 further includes a control unit 301 in addition to the hard disk 105. The control unit 301 is configured to process the data transmitted by the computing node, then store the processed data in the hard disk 105, and manage the hard disk 105.

Figure 3:
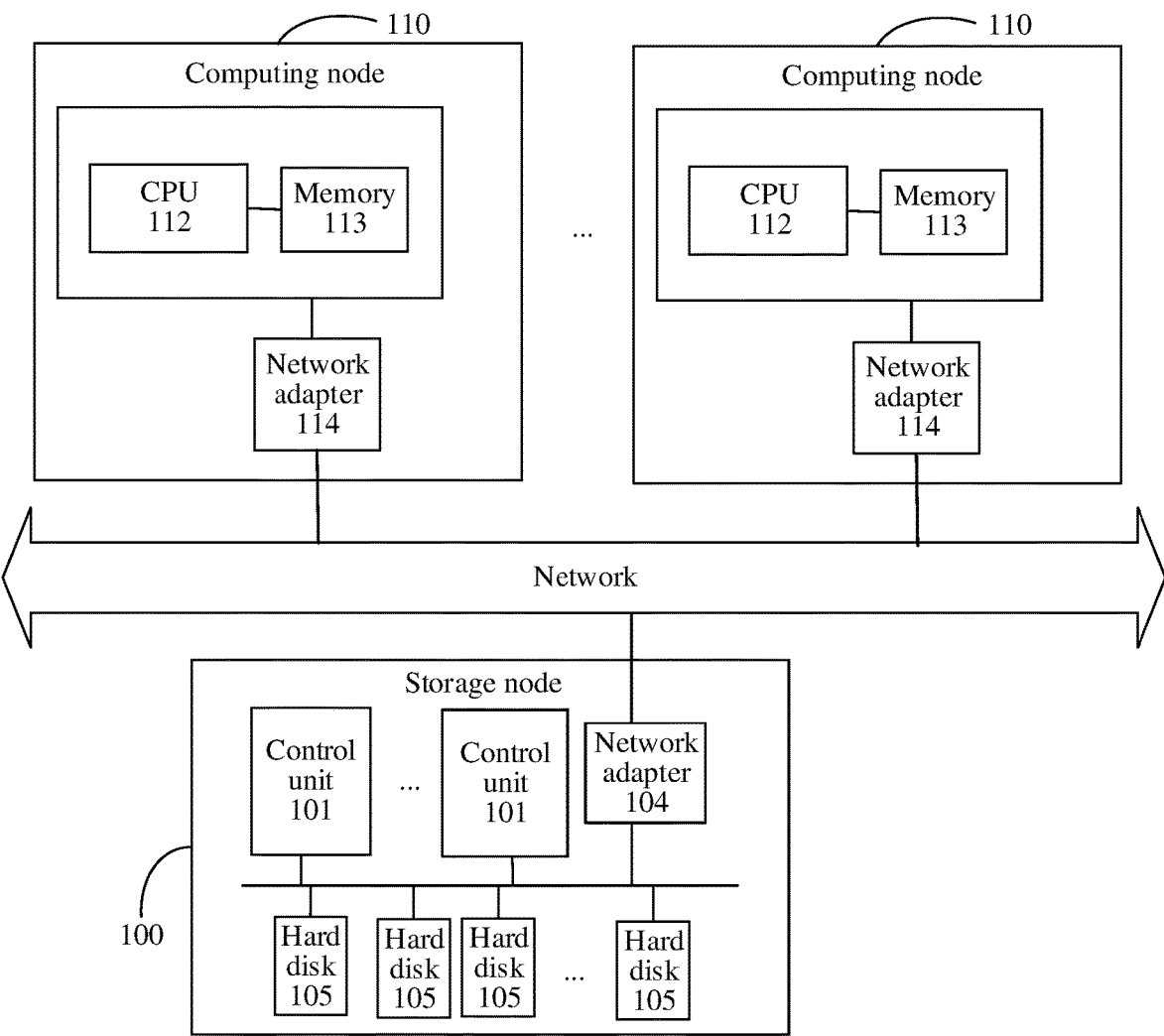
FIG. 3 is an example diagram of a structure of a centralized storage system according to an embodiment of this application.

FIG. 1 is the diagram of the architecture of the distributed storage system. The solutions in embodiments of this application may alternatively be applied to a centralized storage system. In the centralized storage system, data of a computing node is stored in a storage node, and the storage node may be, for example, a storage array. FIG. 3 shows an architecture of a centralized storage system. A structure of a storage node 100 and a structure of a computing node 110 are the same as those in FIG. 1. Details are not described herein again. The storage node 100 shown in FIG. 3 is of a disk-controller integrated structure. In the centralized storage system, the structure of the storage node may alternatively be the disk-controller separated structure shown in FIG. 2.

Various applications are run on each computing node 110. A database application is an application that is commonly used. In embodiments of this application, for ease of description, a storage-compute separated storage system that includes the computing node running the database application and the storage node is referred to as a storage-compute separated database system.

Currently, in a storage-compute separated database system, a computing node 110 communicates with a storage node 100 via a file system or a block device. Before requesting the storage node to execute an operation request, the computing node 110 needs to convert a database semantic operation request into a file system semantic operation request or a block device semantic operation request. Consequently, load of the computing node is increased, and communication efficiency between the computing node and the storage node is low.

In addition, to convert the database semantic operation request into the file system semantic operation request or the block device semantic operation request, the computing node 110 needs to store metadata of data in the database system in the computing node, for example, a directory and a file in a file system to which a page in an accessed database belongs; or a block device (LUN) to which the page belongs and a logical block address (LBA) in the LUN. Management of the metadata of the data in the database system also increases the load of the computing node. The computing node further needs to perform adaptation based on a type of the storage node. For example, if the type of the storage node is a network-attached storage (NAS), the computing node needs to be adapted to be able to convert data of database semantics into file system semantics. When the type of the storage node is a storage area network (SAN), the computing node needs to be adapted to be able to convert data of data block semantics into block device semantics.

Figure 4:
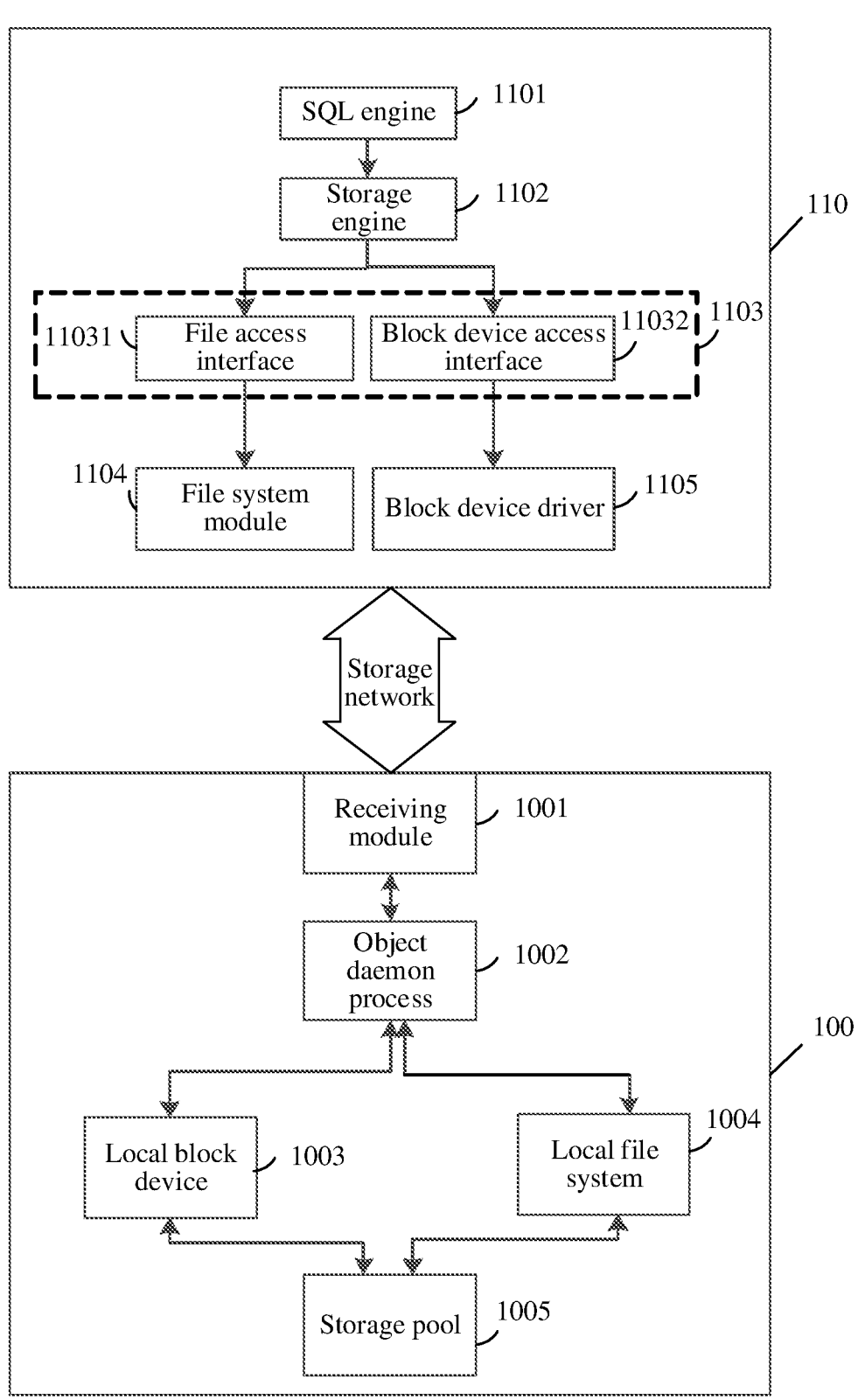
FIG. 4 is an example diagram of an architecture of a data access method in a conventional technology according to this application.

For example, FIG. 4 is a schematic diagram of data communication between the computing node 110 and the storage node 100 in a conventional technology. As shown in FIG. 4, the computing node 110 includes a structured query language (SQL) engine 1101, a storage engine 1102, and a storage adaptation layer 1103. The storage adaptation layer 1103 includes a file access interface 11031 or a block device access interface 11032. The memory 113 in the computing node 110 stores a database program. A CPU 112 runs the database program to implement functions of the SQL engine 1101, the storage engine 1102, and the storage adaptation layer 1103.

The SQL engine 1101 is responsible for parsing a database query request (for example, an SQL request) into a plurality of tasks. The storage engine 1102 is configured to parse each task into a database semantic operation request for performing an operation on a data object in a database, for example, an operation request executed on a data object such as a database instance, a table, a page, a log, or the like in the database. As described above, the storage node generally includes two types: the NAS on which the file system is installed, and the SAN providing the block device. To communicate with the storage node, the computing node also needs to be provided with a corresponding interface, to convert the database semantic operation request into a request that can be identified by the storage node. For example, for the storage node on which the file system is installed, the file access interface 11031 needs to be installed in the computing node. For the storage node providing the block device, the block device access interface 11032 needs to be installed in the computing node. The storage engine 1102 invokes the file access interface 11031 or the block device access interface 11032 based on the type of the storage node, to convert the database semantic operation request into the file system semantic operation request or the block device semantic operation request. After being processed by a file system module 1104 or a block device driver 1105 provided by an operating system, the converted operation request is encoded into a data packet, and is transmitted to the storage node via a storage network.

The storage node 100 includes a receiving module 1001 and an object daemon process 1002. A database program is stored in a memory of the storage node 100. The database program stored in the storage node 100 corresponds to the database program stored in the computing node 110. A CPU of the storage node 100 executes the database program in the memory to implement functions of the receiving module 1001 and the object daemon process 1002. The receiving module 1001 is responsible for receiving the data packet transmitted via the storage network and parsing the operation request and data in the data packet. The object daemon process is responsible for determining, based on a local block device 1003 or a local file system 1004, an address of data that is accessed by the operation request and that is in a storage pool, reading or writing the data from the storage pool 1005, and processing the data, for example, performing deduplication, compression, replication, or the like.

It can be seen from FIG. 4 that, to enable the storage node to perform an operation specified by the database, the computing node first converts the database semantic operation request into the file semantic operation request by invoking the file access interface 11031, or converts the database semantic operation request into the block device operation request by invoking the block device access interface 11032.

More specifically, for a data access method shown in FIG. 4, data outputted by the database cannot be delivered to the operating system. The operation request outputted by the storage engine 1102 needs to be converted into the file operation request or the block device operation request via the file access interface or the block device access interface.

However, in the storage device, the object daemon process needs to find, via the local block device or the local file system, a data object that is accessed by the operation request, to process the data object. Consequently, data access efficiency is low.

In view of this, in embodiments of this application, the database semantic operation request may be sent to the storage node by using the transmission command. The storage node may obtain the database semantic operation request through parsing the transmission command, and process the database semantic operation request. In this way, the file system or the block device between the computing node and the storage node is removed. Therefore, the data access efficiency is improved.

Figure 5:
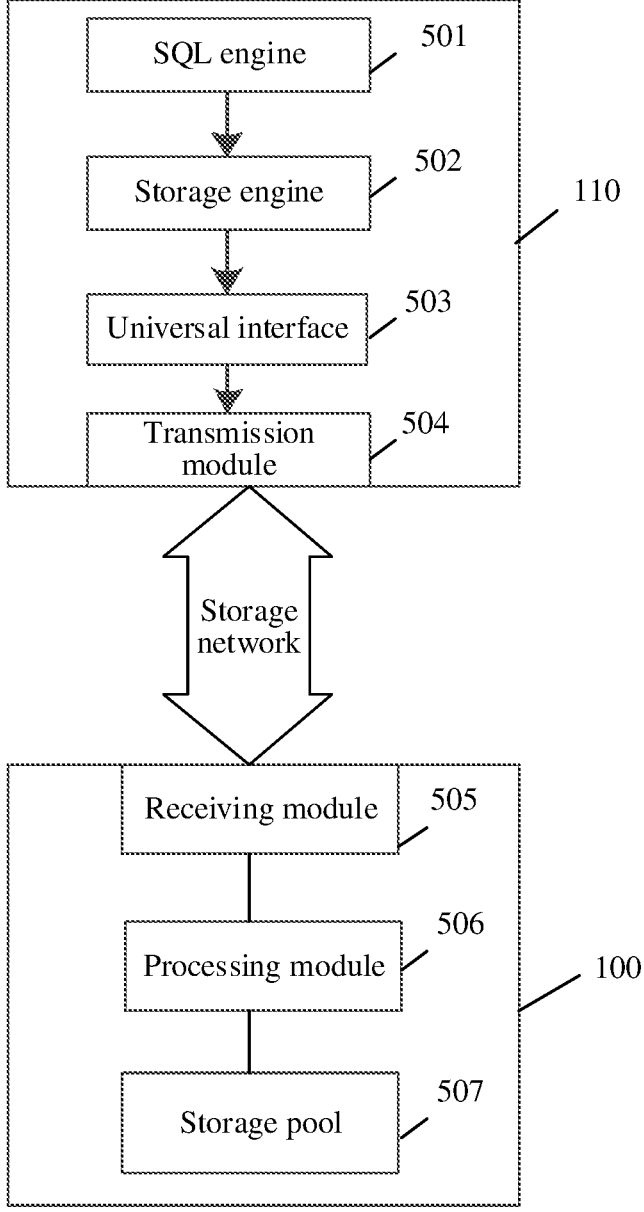
FIG. 5 is an example diagram of an architecture of a data access method according to an embodiment of this application.
Figure 6:
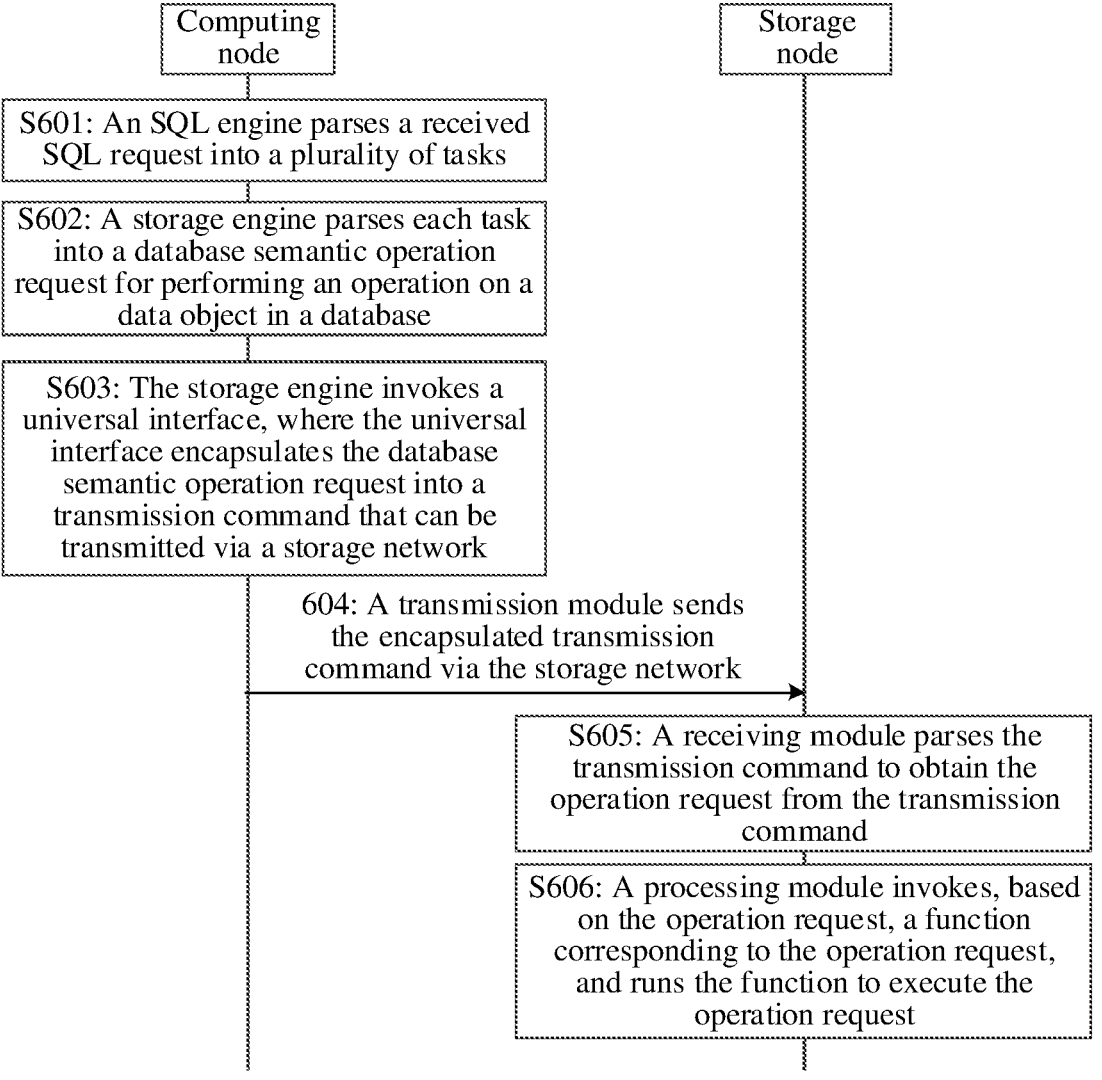
FIG. 6 is an example flowchart of a data access method according to an embodiment of this application.

FIG. 5 is a schematic diagram of data communication between a computing node 110 and a storage node 100 according to an embodiment. Compared with FIG. 4, in the computing node 110, only one universal interface 503 needs to be provided. Different interfaces do not need to be provided for different storage devices. In addition, in the storage device 100, a processing module 506 can access a storage pool 507 without a local file system or a local block device. Modules of the computing node 110 and the storage node 100 are also implemented by respective CPUs running application programs stored in respective memories. The following describes, with reference to a flowchart shown in FIG. 6, a method for communication between a computing node and a storage node in a database system according to an embodiment of this application. First, in step S601, an SQL engine 501 parses a received SQL request into a plurality of tasks.

In step S602, a storage engine 502 parses each task into a database semantic operation request for performing an operation on a data object in a database.

The operation request may be, for example, an operation request CreateDB (user, db1) for creating a database instance, where user indicates a user name of the database instance, and db1 is a name of the database instance; or a request DeleteDB (db1) for deleting a database instance db1, where db1 is a name of the to-be-deleted database instance.

In step S603, the storage engine 502 invokes a universal interface 503. The universal interface 503 encapsulates the database semantic operation request into a transmission command that can be transmitted via a storage network.

In this embodiment of this application, the universal interface 503 includes, according to a communication protocol between the computing node and the storage node, the operation request in a payload field of the transmission command defined by the communication protocol. The payload field is used to carry data transmitted by the transmission command. For example, if the communication protocol is the RDMA protocol, the transmission command is a send command defined by the RDMA protocol. If the communication protocol is the NVMe protocol, the transmission command is a write command defined by the NVMe protocol. If the communication protocol is the iSCSI protocol, the transmission command is a write command defined by the iSCSI protocol.

In step S604, a transmission module 504 sends the encapsulated transmission command to the storage node via the storage network.

In step S605, a receiving module 505 in the storage node parses the transmission command, to obtain the operation request from the transmission command.

After receiving the transmission command, the transmission module obtains the operation request from the payload field of the transmission command based on a command format defined by the communication protocol.

In step S606, a processing module 506 invokes, based on the operation request, a function corresponding to the operation request, and runs the function, to execute the operation request.

In this embodiment of this application, an administrator logs in to the storage node, pre-registers, with the storage node, the function that executes the database semantic operation request, and records, in an interface semantic table, a registered function in a form of an interface. The interface semantic table records a storage address of each function. The processing module searches, based on the operation request, the interface semantic table for the function corresponding to the operation request, obtains the function based on the storage address of the function recorded in the interface semantic table, assigns an identifier of an operation object carried in the operation request to the function, and performs the function, to perform, on the data object, the operation that is requested by the operation request.

Functions registered in the interface semantic table include but are not limited to:

CreateDB (user, db), used to create a database instance, where user indicates a user name of the created database instance, and db is an identifier of the created database instance;

DeleteDB (db), used to delete a database instance, where db is an identifier of the to-be-deleted database instance;

CreateTable (db, table), used to create a table, where db is an identifier of a database instance to which the to-be-created table belongs, and table is an identifier of the created table;

DeleteTable (db, table), used to delete a table, where db is an identifier of a database instance to which the to-be-deleted table belongs, and table is an identifier of the deleted table;

TruncateTable (db, table), used to truncate a table, where db is an identifier of a database instance to which the to-be-truncated table belongs, and table is an identifier of the truncated table;

BackupDB (db, backup), used to create a database instance backup, where db is an identifier of a database instance for which the database backup is to be created, and backup is an identifier of the created database backup;

RestoreDB (db, backup), used to restore a database instance backup, where db is an identifier of a to-be-restored database instance, and backup is an identifier of the backup of the database instance;

CheckpointDB (db, checkpoint), used to create a database instance checkpoint, where db is an identifier of a database instance for which the database checkpoint is created, and checkpoint is an identifier of the to-be-created database instance checkpoint;

RestoreCheckpoint (db, checkpoint), used to restore a database instance checkpoint, where db is an identifier of a database instance to which the to-be-restored checkpoint belongs, and checkpoint is an identifier of the restored checkpoint;

DeleteCheckpoint (db, checkpoint), used to delete a database instance checkpoint, where db is an identifier of a database instance to which the to-be-deleted checkpoint belongs, and checkpoint is an identifier of the deleted checkpoint;

CloneDB (db, newdb), used to clone a database instance, where db is an identifier of the cloned database instance, and newdb is an identifier of a new database instance obtained through cloning;

CreatePage (page, data, MVCC), used to create a page, where page is an identifier of the created page, data is data in the created page, and MVCC is a version of the created page;

DeletePage (page), DeletePage (page), used to delete a page, where page is an identifier of the to-be-deleted page;

GetPagesNDP (pages[ ], MVCC[ ], Page operator), Page operator), used to apply a page operator to a plurality of pages and push the page operator down to a storage node for execution, where pages[ ] is a set of the plurality of pages to which the page operator is applied, MVCC[ ] is a version set of the plurality of pages to which the page operator is applied, and Page operator is an identifier of the page operator;

WritePage (page, data, MVCC), used to write data that corresponds to a page to a storage node, where page is an identifier of the to-be-written page, data is the data in the written page, and MVCC[ ] is a version of the written page;

ReadPage (page, data, MVCC), used to read data from a storage node, and store the read data in memory space that is of a computing node and that is indicated by data, where page is an identifier of the to-be-read page, data is a memory address of the computing node, and MVCC[ ] is a version of the read page;

CreateRow (table, row), used to add a row to a table of a storage node, where table is an identifier of the table in which to-be-created row data is located, and row is an identifier of the created row;

DeleteRow (table, row), used to delete row data in a table, where table is an identifier of the table in which the to-be-deleted row data is located, and row is an identifier of a deleted row;

GetRowsNDP (table, rows[ ], MVCC[ ], Row operator), MVCC[ ], Row operator), used to apply a row operator to a plurality of rows and push the row operator down to a storage node for execution, where table is an identifier of a table in which the plurality of applied rows are located, rows[ ] is a set of the plurality of rows to which the row operator is applied, MVCC[ ] is a row version, and Row operator is an identifier of the row operator;

readRow (table, row, data), used to read row data from a table, and store the read data in memory space that is in a computing node and that is indicated by data, where table indicates an identifier of the table in which the to-be-read row data is located, row is an identifier of a read row, and data indicates a memory address that is in the computing node and that stores the read data;

WriteRow (table, row, data), used to write row data to a table, where table is an identifier of the table in which a to-be-written row is located, row is an identifier of the written row, and data indicates the written data;

CreateLog (log), used to create a log in a storage node, where log is an identifier of the to-be-created log.

DeleteLog (log), used to delete a log, where log is an identifier of the to-be-deleted log;

ReadLog (log, data), used to read a log from a storage node, where log is an identifier of the to-be-read log, and data is a storage address that is in a computing node and that stores the read log;

WriteLog (log, data), used to write a log to a storage node, where log is an identifier of the written log, and the data is written log data;

MDcreate (key), used to create metadata in a storage node, where key indicates an identifier of the created metadata;

MDdelete (key), used to delete metadata in a storage node, where key indicates an identifier of the deleted metadata;

MDRead (key, data, version), used to read metadata from a storage node, where key indicates an identifier of the read metadata, version is a version of the read metadata, and data is a memory address that is in a computing node and that stores metadata of data;

MDWrite (key, data, version), used to write metadata to a storage node, where key indicates an identifier of the written metadata, and version is a version of the written metadata;

LockObj (object, mode, term), used to lock a data object in a storage node, where object is the data object, and a type of the data object may include global, database instance (DB), table, page, row, and metadata; and mode is a lock mode, and a type of the lock mode includes intention sharing, intention exclusive, sharing, reading, writing, exclusive, user-defined priority, and the like;

UnlockObj (object, term), used to unlock a data object stored in a storage node, where object indicates the unlocked data object, and a category of the data object is the same as that of a locked data object;

PreemptLock (object, term), used to preempt a lock, where object indicates a locked object;

defineNDP (operator, lambda), used to register an operator in a storage node, where operator indicates an identifier of the registered operator, and lambda indicates program code of the operator; and CallNDP (log[ ], pages[ ], row[ ], operator), where for an operator pushdown operation request, the function is first invoked, then an operator of the function is invoked, operator is an operator identifier, log[ ] is a set of a plurality of logs to which the operator is applied, pages[ ] is a set of a plurality of pages to which the operator is applied, and row[ ] is a set of a plurality of rows to which the operator is applied.

For example, an operator type may include a log operator, the page operator, and the row operator. For example, the log operator may be a replicate log operator, a truncate log operator, or a filter (filter) operator. The page operator may be, for example, a replay page operator. The row operator may be, for example, a sum operator, a min operator, a max operator, a sort operator, an average operator, and a filter operator.

In embodiments, operation requests corresponding to the registered functions in the interface semantic table are generally classified into three types. A first-type operation request is related to a data operation, for example, deleting the database instance, deleting the table, truncating the table, creating the database instance backup, deleting the database instance backup, creating the database instance checkpoint, restoring the database instance checkpoint, deleting the database instance checkpoint, cloning the database instance, writing the page, reading the page, creating the row, deleting the row, reading the row, writing the row, deleting the database log, reading the log, writing the log, reading the metadata, writing the metadata, deleting the metadata, locking the data object, and unlocking the data object. A second-type operation request is an operation request not related to the data operation, for example, a data object creation request. The second-type operation request specifically includes: creating the database instance, creating the table, creating the metadata, or creating the database log. A third-type operation request is an operator pushdown operation request. The operator pushdown operation request is pushing down an operator that is in the computing node and that performs a database task to the storage node for execution. This type of operation request needs to carry an identifier of the pushed-down operator in the operation request. The following separately describes the three types of operation requests.

For the first-type operation request, when a function corresponding to the operation request is performed, a storage address of data corresponding to a data object needs to be first determined based on an identifier that is of a data object and that is carried in the operation request. Then an operation requested by the operation request is performed, based on the storage address, on the data corresponding to the data object. In embodiments of this application, after data corresponding to all operation objects is stored in the storage node, a storage address corresponding to a data identifier is directly recorded in metadata of the data. During data reading, the data can be read from the storage node based on the metadata provided that the data identifier is carried in the operation request. In this way, because the data does not need to be organized via a file system or a block device, efficiency of obtaining the data is improved, and metadata of the data is simplified.

The following describes a specific process of executing the first-type operation request by using a processing process of an operation request for writing a page as an example.

Figure 7:
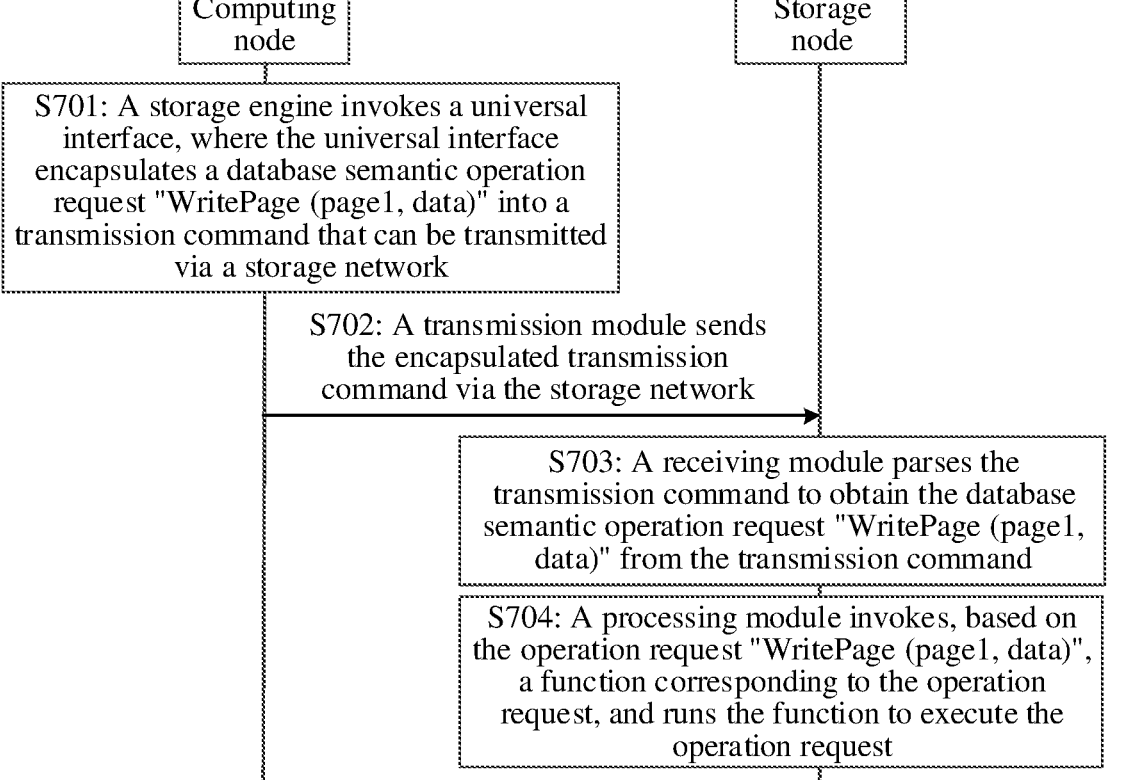
FIG. 7 is an example flowchart of a data access method according to another embodiment of this application.

In an embodiment, an example in which a database semantic operation request "WritePage (page1, data)" is generated via a storage engine of a computing node is used for detailed description. WritePage indicates the operation request for writing the page, page1 indicates that an operation object is page1, and data indicates data that is written to page1. For a specific execution process of the operation request for writing the page, refer to descriptions in FIG. 7.

In step S701, the storage engine invokes a universal interface. The universal interface encapsulates the database semantic operation request "WritePage (page1, data)" into a transmission command that can be transmitted via a storage network.

In this embodiment, to implement transmission of "Write-Page (page1, data)" on the storage network, "WritePage (page1, data)" needs to comply with a transmission protocol of the storage network. Therefore, in this embodiment, the storage engine invokes the universal interface to include, in a payload field of the transmission command, the database semantic operation request "WritePage (page1, data)", as data of the transmission command defined by the communication protocol between a computing node and a storage node. Therefore, "WritePage (page1, data)" can be transmitted to the storage node via the storage network.

For example, if the communication protocol is the RDMA protocol, the transmission command is a send command defined by the RDMA protocol. In this case, the universal interface may use the database semantic operation request "WritePage (page1, data)" as data of the send command. Therefore, the operation request is carried in a payload field of the send command.

In step S702, a transmission module sends the encapsulated transmission command to the storage node via the storage network.

In this embodiment, after the universal interface includes, in the transmission command according to the communication protocol between the computing node and the storage node, "WritePage (page1, data)" as the data of the transmission command defined by the communication protocol between the computing node and the storage node, the transmission command can be sent to the storage node via the storage network.

In step S703, a receiving module in the storage node parses the transmission command to obtain the database semantic operation request "WritePage (page1, data)" from the transmission command.

In step S704, a processing module invokes, based on the operation request, a function corresponding to the operation request "WritePage (page1, data)", and runs the function to execute the operation request "WritePage (page1, data)".

In this embodiment, after parsing the operation request "WritePage (page1, data)", the processing module of the storage node first obtains the function that can execute the operation request "WritePage" from an interface semantic table registered on the storage node by a user, and assigns a parameter value carried in the operation request to the function. In this case, the storage node may determine the operation request is an operation request for writing the data to the page whose name is page1, and write the data to page1.

When the function is performed, the processing module first allocates an address from a storage pool to the page1 based on a size of the written data. After the address is allocated, the processing module writes the data carried in the operation request for writing the page to the storage pool. After the data is written, the processing module generates metadata, and records a correspondence between a data identifier, namely, the page1, and a storage address.

It should be understood that, before "WritePage (page1, data)" is executed, a database instance needs to be created first. Then a table is created based on the database instance. Finally, the data is written to the page based on the table. Therefore, in this embodiment, an identifier of page1 may include a database instance identifier, a table identifier, and a page identifier, used to identify the database instance, the table, and the page to which the data belongs.

After page1 is written to the storage node, the computing node can directly include the data identifier page1 in a read request to read page1. After receiving the read request, the storage node finds the storage address of the page1 based on the metadata of page1, and may read the data corresponding to page1.

For the second-type operation request, an execution process of the computing node is the same as the execution process of the first-type operation request. A difference lies in that when the storage node performs a function corresponding to the operation request, only a data object is created, and there is no operation on the data of the data object. For example, for an operation request for creating a database instance, the storage node invokes a function for creating the database instance from the interface semantic table. When the function is performed, only one object of the database instance is created in the storage node, for example, a that records merely a name of the database instance. Because no data is generated, there is no access to the storage pool. After the database instance is created, a table may be further created based on the database instance. For example, for an operation request for creating the table, the database instance to which the table belongs is recorded in the storage node, and there is no operation related to the data. When the data needs to be written to the table subsequently, for example, when a page, a row, or a column is written to a table object, an address is allocated in the storage pool. In addition to creating the database instance and creating the table, the second-type operation request further includes creating the metadata and creating the database log. Specific execution processes of the operation requests for creating the metadata and the database log are similar to the execution processes of creating the database instance and creating the table. Details are not described herein again.

For the third-type operation request, after the SQL engine parses an SQL statement into a task, some operators that perform the task are pushed to the storage node for execution, to reduce data communication between the computing node and the storage node. In a conventional technology, an operator is first registered with a storage node, and then the operator is returned to a computing node as a file in a file system. When performing an operator pushdown task, the computing node needs to convert the operator into the file. The storage node finds the corresponding operator based on a directory structure in the file system, and performs an operator pushdown operation. In other words, in the operator pushdown operation, the to-be-pushed operator also needs to be converted via the file system. Consequently, efficiency of executing the operator pushdown operation request is affected.

The database system in embodiments of this application provides the third-type operation request, and directly includes, in the operation request, the identifier of the operator as a data object of the operation request. After receiving the operation request, the storage node obtains a pre-registered operator based on the identifier of the operator in the operation request, and executes the operator. In other words, in an operator pushdown process, the operator does not need to be converted into a file and delivered to the storage node, and the storage node does not need to search the file system for the operator. Therefore, the efficiency of executing the operator pushdown operation request is improved. The following describes, with reference to FIG. 8, a process of executing an operator pushdown request according to an embodiment of this application.

Before performing operator pushdown, an operator needs to be registered first. In a possible implementation, a computing node may send an operator registration request to a storage node. An operation object is the operator. After receiving the operator registration request, the storage node stores the operator, and records a mapping relationship between an identifier of the operator and an address that stores the operator.

For example, a form of the operator registration request is "defineNDP (operator1, lambda)". operator1 indicates an operator name, and lambda indicates a code program of operator1. After receiving "defineNDP (operator1, lambda)", the storage node may allocate a segment of storage address to the code program lambda of operator1, to store the code program lambda, and records a mapping relationship between an identifier of the operator operator1 and storage address of lambda. It should be noted herein that a specific process in which the computing node transmits "defineNDP (operator1, lambda)" to a storage network and the storage node parses "defineNDP (operator, lambda)" by receiving a transmission command sent by the storage network may be similar to the descriptions of writing data in the foregoing embodiment. Details are not described herein again.

After the computing node registers the operator with the storage node, the computing node can push down a computing task that needs to be completed in the computing node to the storage node. In other words, an operator pushdown function of the computing node is completed.

Figure 8:
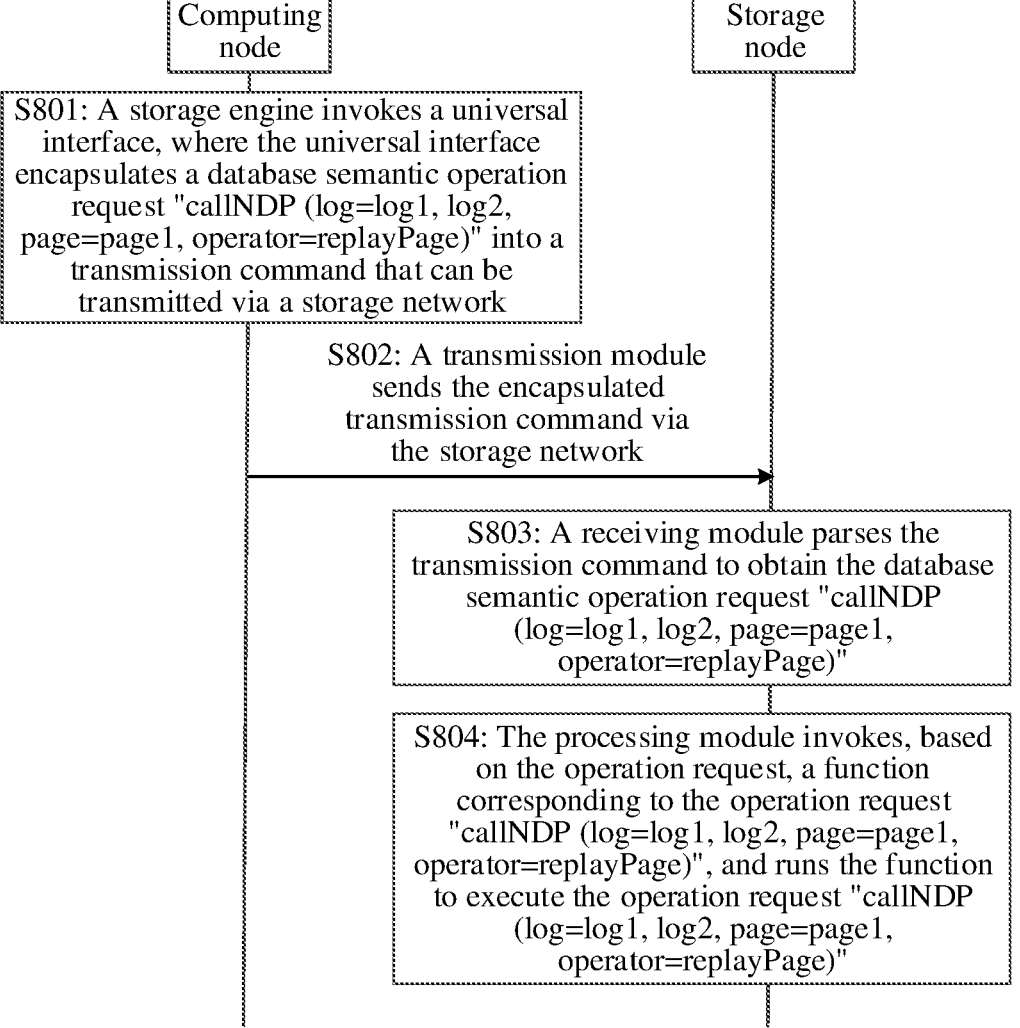
FIG. 8 is an example flowchart of a data access method according to still another embodiment of this application.

With reference to FIG. 8, the following describes in detail a method for performing an operator pushdown operation in a database system in this application.

In this embodiment, an example in which a database semantic operation request "callNDP (log=log1, log2, page=page1, operator=replayPage)" is generated via a storage engine of the computing node is used for detailed description. log1 and log2 are log names, and page1 is a page name. In other words, log1, log2, and page1 are to-be-operated data. replayPage is a name of an operator, and the operator indicates that a to-be-performed operator operation is a page replay operation. To be specific, the operation request "callNDP (log=log1, log2, page=page1, operator=replayPage)" indicates that the computing node requests the storage node to perform a computing task of combining log1, log2, and page1 into a new page. In other words, the task of combining log1, log2, and page1 into the new page is pushed down to the storage node for completion.

As shown in FIG. 8, a procedure of performing operator pushdown mainly includes the following steps.

In step S801, the storage engine invokes a universal interface. The universal interface encapsulates the database semantic operation request "callNDP (log=log1, log2, page=page1, operator=replayPage)" into a transmission command that can be transmitted via the storage network.

In this embodiment, to implement transmission of the operator pushdown operation request "callNDP (log=log1, log2, page=page1, operator=replayPage)" on the storage network, "callNDP (log=log1, log2, page=page1, operator=replayPage)" needs to comply with a transmission protocol of the storage network. Therefore, in this embodiment, the storage engine invokes the universal interface, to include, in the transmission command, the database semantic operation request "callNDP (log=log1, log2, page=page1, operator=replayPage)" as data (a payload) of the transmission command defined by the communication protocol between the computing node and the storage node. Therefore, "callNDP (log=log1, log2, page=page1, operator=replayPage)" can be transmitted to the storage node via the storage network.

For example, "callNDP (log=log1, log2, page=page1, operator=replayPage)" may be encoded as "protobuf: func: name=callNDP; args: len=3; arg[1]: type=log; len=9; value="log1, log2"; arg[2]: type=page; len=5; value="page1"; arg[3]: type=operator; len=10; value="replayPage"; return: type=buf; len=8k; value=" "". Then, encoded data is transmitted on the storage network as the data of the transmission command.

In step S802, a transmission module sends the encapsulated transmission command to a processing module in the storage node via the storage network.

In this embodiment, the storage network may be a small computer system interface (SCSI) network, or may be a Nof (whose full name is non-volatile memory express over fabric) network, or may be a RoCE (whose full name is RDMA over converged Ethernet) network. For detailed descriptions of the SCSI network, the Nof network, the RoCE network, and a transmission command corresponding to each network protocol, refer to a conventional technology. Details are not described in this embodiment.

In step S803, a receiving module in the storage node parses the transmission command to obtain the database semantic operation request "callNDP (log=log1, log2, page=page1, operator=replayPage)" from the transmission command.

In step S804, the processing module invokes, based on the operation request, a function corresponding to the operation request "callNDP (log=log1, log2, page=page1, operator=replayPage)", and runs the function to execute the operation request "callNDP (log=log1, log2, page=page1, operator=replayPage)".

In this embodiment, after parsing the operation request "callNDP (log=log1, log2, page=page1, operator=replayPage)", the receiving module of the storage node first obtains, the function that can execute the operation request "callNDP" from an interface semantic table registered on the storage node by a user, and assigns a parameter value in "callNDP (log=log1, log2, page=page1, operator=replayPage)" to the function. When the function is performed, the storage node may obtain corresponding metadata based on data identifiers log1, log2, and page1, then obtain storage addresses of log1, log2, and page1 from the metadata that records a correspondence between log1, log2, and page1 and storage addresses, and then read data of log1, log2, and page1 from the storage addresses. As described above, when executing the operator registration request, the storage node records a correspondence between the identifier of the registered operator and the storage address. Therefore, when the function is performed, the operator may be obtained based on the identifier of the operator, and then the obtained operator is executed. To be specific, the data of log1, log2, and page1 is replayed, to obtain a new page. In other words, the operator pushdown request is executed.

The method steps in embodiments of this application may be implemented in a hardware manner, or may be implemented in a manner of executing software instructions by a processor. The software instructions may include a corresponding software module. The software module may be stored in a random access memory, a flash memory, a read-only memory, a programmable read-only memory, an erasable programmable read-only memory, an electrically erasable programmable read-only memory, a register, a hard disk, a removable hard disk, a CD-ROM, or any other form of storage medium well-known in the art. For example, a storage medium is coupled to the processor, so that the processor can read information from the storage medium and write information into the storage medium. Certainly, the storage medium may be a component of the processor. The processor and the storage medium may be disposed in an ASIC. In addition, the ASIC may be located in a network device or a terminal device. Certainly, the processor and the storage medium may alternatively exist as discrete components in the network device or the terminal device.

All or some of the foregoing embodiments may be implemented by using software, hardware, firmware, or any combination thereof. When software is used to implement the foregoing embodiments, all or some of the foregoing embodiments may be implemented in a form of a computer program product. The computer program product includes one or more computer programs or instructions. When the computer programs or instructions are loaded and executed on a computer, all or some of the procedures or functions in embodiments of this application are performed. The computer may be a general-purpose computer, a dedicated computer, a computer network, a network device, user equipment, or another programmable apparatus. The computer programs or instructions may be stored in a computer-readable storage medium, or may be transmitted from a computer-readable storage medium to another computer-readable storage medium. For example, the computer programs or instructions may be transmitted from a website, computer, server, or data center to another website, computer, server, or data center in a wired manner or in a wireless manner. The computer-readable storage medium may be any usable medium that can be accessed by the computer, or a data storage device, such as a server or a data center, integrating one or more usable media. The usable medium may be a magnetic medium, for example, a floppy disk, a hard disk, or a magnetic tape; or may be an optical medium, for example, a digital video disc; or may be a semiconductor medium, for example, a solid-state drive.

In various embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

In this application, "at least one" means one or more, and "a plurality of" means two or more. The term "and/or" describes an association relationship between associated objects and indicates that three relationships may exist. For example, A and/or B may indicate the following three cases: Only A exists, both A and B exist, and only B exists. A and B each may be singular or plural. In the text descriptions of this application, the character "/" indicates an "or" relationship between associated objects. In a formula in this application, the character "/" indicates a "division" relationship between associated objects.

It may be understood that various numbers in embodiments of this application are merely used for differentiation for ease of description, and are not used to limit the scope of embodiments of this application. The sequence numbers of the foregoing processes do not mean execution sequences, and the execution sequences of the processes should be determined based on functions and internal logic of the processes.

What is claimed is:

1. A data transmission method, performed by a storage device, wherein the method comprises:
   receiving a transmission command sent by a computing device, wherein the transmission command carries a database operation request, wherein the database operation request is encapsulated by a universal interface invoked by the storage device into the transmission command that is transmitted via a storage network, and the database operation request is used to request to perform an operation on a data object in a database;
   parsing the transmission command to obtain the database operation request;
   performing, on the data object, the operation that is requested by the database operation request; and
   wherein a storage address of the data object corresponding to an identifier of the data object which is carried in the database operation request is directly recorded in metadata of data corresponding to the data object, wherein the storage device reads the data based on the metadata directly without a file system or a block device in between the storage device and the computing device.

2. The method according to claim 1, wherein the storage device stores a function that executes the database operation request, and the function is a database semantic function; and wherein the performing, on the data object, the operation that is requested by the database operation request comprises:

invoking the function based on the database operation request to perform the operation that is requested by the database operation request.

3. The method according to claim 2, wherein the database operation request is a data operation request, and the data object comprises an identifier of to-be-operated data; and wherein the invoking the function based on the database operation request to perform the operation that is requested by the database operation request comprises:

based on the function being performed, determining an address of the to-be-operated data based on the identifier of the to-be-operated data; and performing an operation on the to-be-operated data based on the address of the to-be-operated data.

4. The method according to claim 3, wherein the storage device stores a correspondence between the identifier of the to-be-operated data and the storage address of the to-be-operated data; and wherein the determining the address of the to-be-operated data based on the identifier of the to-be-operated data comprises:

determining, based on the correspondence, the address that is of the to-be-operated data and that corresponds to the identifier of the to-be-operated data.

5. The method according to claim 3, wherein the data object comprises any one or more of the following: a database instance, a table, a page, metadata, a log, a database checkpoint, a row, or a column.

6. The method according to claim 5, wherein the data operation request comprises any one or more of the following operation requests:

deleting the database instance,
deleting the table,
truncating the table,
creating a database instance backup,
deleting the database instance backup,
creating the database checkpoint,
restoring the database checkpoint,
deleting the database checkpoint,
cloning the database instance,
writing the page,
reading the page,
creating the row,
deleting the row,
reading the row,
writing the row,
deleting a database log,
reading the log,
writing the log,
reading the metadata,
writing the metadata,
deleting the metadata,
locking the data object, and
unlocking the data object.

7. The method according to claim 2, wherein the database operation request is a data object creation request, and the invoking the function based on the database operation request to perform the operation that is requested by the database operation request comprises:

creating the data object in the storage device by performing the function.

8. The method according to claim 7, wherein the database operation request comprises any one of the following operation requests: creating a database instance, creating a table, creating metadata, or creating a database log.

9. The method according to claim 2, wherein the storage device stores an operator that performs a database task, the database operation request is an operator pushdown request, and an operation object comprises an operator identifier and an identifier of data performed by the operator corresponding to the operator identifier; and wherein the invoking the function based on the database operation request to perform the operation that is requested by the database operation request comprises:

invoking and performing a function corresponding to the operator pushdown request;

based on the function being performed, obtaining the operator corresponding to the operator identifier based on the operator identifier;

obtaining the data corresponding to the data identifier based on the data identifier; and using the operator to perform an operation corresponding to the operator on the data.

10. The method according to claim 2, wherein the database operation request is an operator registration request, an operation object comprises an operator identifier, and an operator is used to perform a database task; and wherein the invoking the function based on the database operation request to perform the operation that is requested by the database operation request comprises:

based on the function being performed, allocating a storage address to the operator; storing the operator; and recording a correspondence between the operator identifier of the operator and the storage address of the operator.

11. The method according to claim 1, wherein the storage device is a device configured to perform persistent storage on the data, and the storage device is a storage node in a storage array or a distributed storage system.

12. The method according to claim 1, wherein the transmission command comprises a payload field, and the payload field comprises the database operation request.

13. The method according to claim 1, wherein the transmission command is transmitted according to one of the following:

a non-Volatile Memory Express (NVMe) protocol,
an Internet small computer system interface (iSCSI) protocol, or
a remote direct memory access (RDMA) protocol.

14. A storage device, comprising at least one processor and a memory, the memory stores a computer program, that when executed by the at least one processor, causes the server to perform operations comprising:

receiving a transmission command sent by a computing device, wherein the transmission command carries a database operation request, wherein the database operation request is encapsulated by a universal interface invoked by the storage device into the transmission command that is transmitted via a storage network, and the database operation request is used to request to perform an operation on a data object in a database;

parsing the transmission command to obtain the database operation request;

performing, on the data object, the operation that is requested by the database operation request; and wherein a storage address of the data object corresponding to an identifier of the data object which is carried in the database operation request is directly recorded in metadata of data corresponding to the data object, wherein the storage device reads the data based on the metadata directly without a file system or a block device in between the storage device and the computing device.

15. The storage device according to claim 14, wherein the storage device stores a function that executes the database operation request, and the function is a database semantic function; and wherein the performing, on the data object, the operation that is requested by the database operation request comprises:

invoking the function based on the database operation request to perform the operation that is requested by the database operation request.

16. The storage device according to claim 15, wherein the database operation request is a data operation request, and the data object comprises an identifier of to-be-operated data; and wherein the invoking the function based on the database operation request to perform the operation that is requested by the database operation request comprises:

based on the function being performed, determining an address of the to-be-operated data based on the identifier of the to-be-operated data; and performing an operation on the to-be-operated data based on the address of the to-be-operated data.

17. The storage device according to claim 16, wherein the storage device stores a correspondence between the identifier of the to-be-operated data and the storage address of the to-be-operated data; and wherein the determining the address of the to-be-operated data based on the identifier of the to-be-operated data comprises:

determining, based on the correspondence, the address that is of the to-be-operated data and that corresponds to the identifier of the to-be-operated data.

18. The storage device according to claim 16, wherein the data object comprises any one or more of the following: a database instance, a table, a page, metadata, a log, a database checkpoint, a row, or a column.

19. The storage device according to claim 18, wherein the data operation request comprises any one or more of the following operation requests:

deleting the database instance,
deleting the table,
truncating the table,
creating a database instance backup,
deleting the database instance backup,
creating the database checkpoint,
restoring the database checkpoint,
deleting the database checkpoint,
cloning the database instance,
writing the page,
reading the page,
creating the row,
deleting the row,
reading the row,
writing the row,
deleting a database log,
reading the log,
writing the log, reading the metadata,
writing the metadata,
deleting the metadata,
locking the data object, and
unlocking the data object.

20. The storage device according to claim 15, wherein the database operation request is a data object creation request, and wherein the invoking the function based on the database operation request to perform the operation that is requested by the database operation request comprises:

creating the data object in the storage device by performing the function.

21. The storage device according to claim 20, wherein the database operation request comprises any one of the following operation requests: creating a database instance, creating a table, creating metadata, or creating a database log.

22. The storage device according to claim 15, wherein the storage device stores an operator that performs a database task, the database operation request is an operator pushdown request, and an operation object comprises an operator identifier and an identifier of data performed by the operator corresponding to the operator identifier; and wherein the invoking the function based on the database operation request to perform the operation that is requested by the database operation request comprises:

invoking and performing a function corresponding to the operator pushdown request;

based on the function being performed, obtaining the operator corresponding to the operator identifier based on the operator identifier;

obtaining the data corresponding to the data identifier based on the data identifier; and using the operator to perform an operation corresponding to the operator on the data.

23. The storage device according to claim 15, wherein the database operation request is an operator registration request, an operation object comprises an operator identifier, and an operator is used to perform a database task; and wherein the invoking the function based on the database operation request to perform the operation that is requested by the database operation request comprises:

based on the function being performed, allocating a storage address to the operator; storing the operator; and recording a correspondence between the operator identifier of the operator and the storage address of the operator.

24. The storage device according to claim 14, wherein the storage device is a device configured to perform persistent storage on the data, and the storage device is a storage node in a storage array or a distributed storage system.

25. The storage device according to claim 14, wherein the transmission command comprises a payload field, and the payload field comprises the database operation request.

26. The storage device according to claim 14, wherein the transmission command is transmitted according to one of the following:

a non-Volatile Memory Express (NVMe) protocol,
an Internet small computer system interface (iSCSI) protocol, or
a remote direct memory access (RDMA) protocol.

27. A storage system, comprising:

a computing device, configured to send a transmission command to a storage device;

the storage device, comprising at least one processor and a memory, the memory stores a computer program, that when executed by the at least one processor, causes the storage device to perform operations comprising:

receiving a transmission command sent by the computing device, wherein the transmission command carries a database operation request, wherein the database operation request is encapsulated by a universal interface invoked by the storage device into the transmission command that is transmitted via a storage network, and the database operation request is used to request to perform an operation on a data object in a database;

parsing the transmission command to obtain the database operation request;

performing, on the data object, the operation that is requested by the database operation request; and wherein a storage address of the data object corresponding to an identifier of the data object which is carried in the database operation request is directly recorded in metadata of data corresponding to the data object, wherein the storage device reads the data based on the metadata directly without a file system or a block device in between the storage device and the computing device.

* * * * *